No. 889,878. PATENTED JUNE 2, 1908.
H. J. HANSON.
ANIMAL RELEASING DEVICE.
APPLICATION FILED NOV. 6, 1906.
4 SHEETS—SHEET 1.
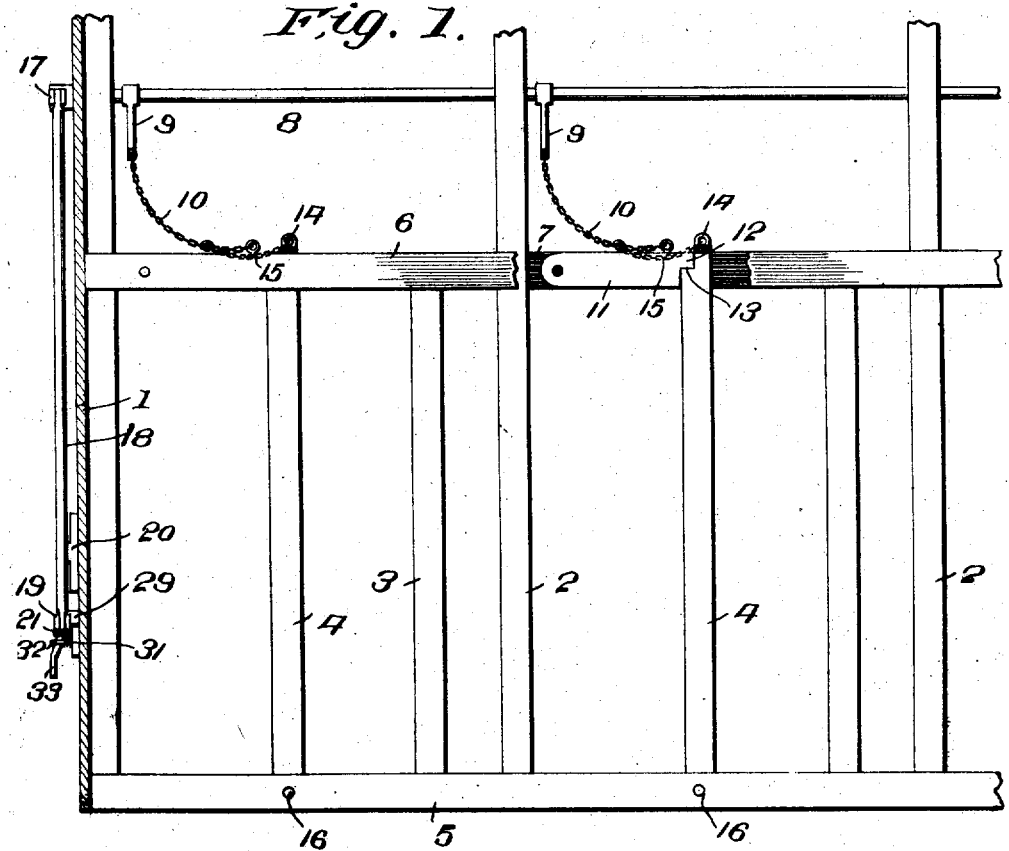
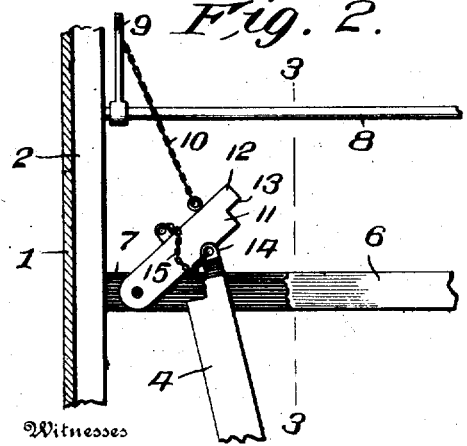
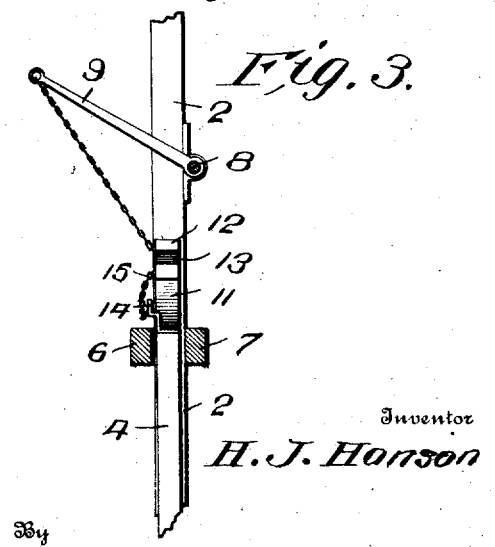
Witnesses
Thos. W. Riley
L. W. Anderson.
Inventor
H. J. Hanson
By
W. J. FitzGerald
Attorneys No. 889,878. PATENTED JUNE 2, 1908.
H. J. HANSON.
ANIMAL RELEASING DEVICE.
APPLICATION FILED NOV. 6, 1906.
4 SHEETS—SHEET 2.
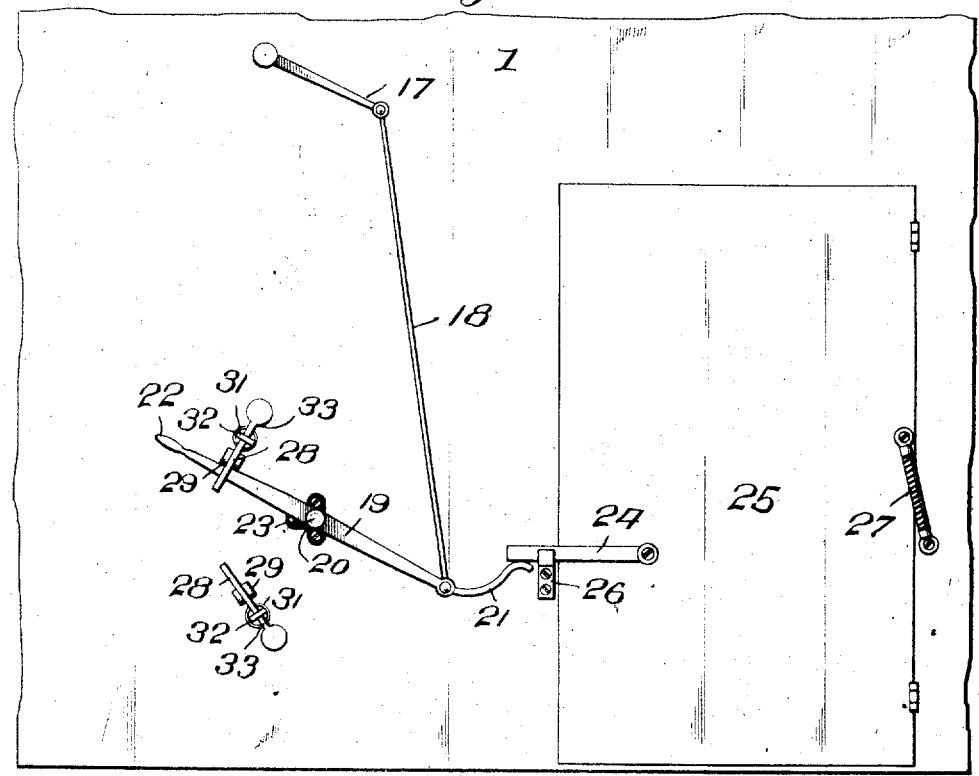
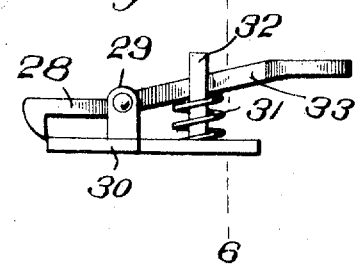
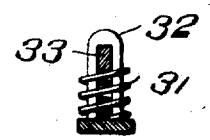
Inventor
H. J. Hanson No. 889,878. PATENTED JUNE 2, 1908.
H. J. HANSON.
ANIMAL RELEASING DEVICE.
APPLICATION FILED NOV. 6, 1906.
4 SHEETS—SHEET 3.
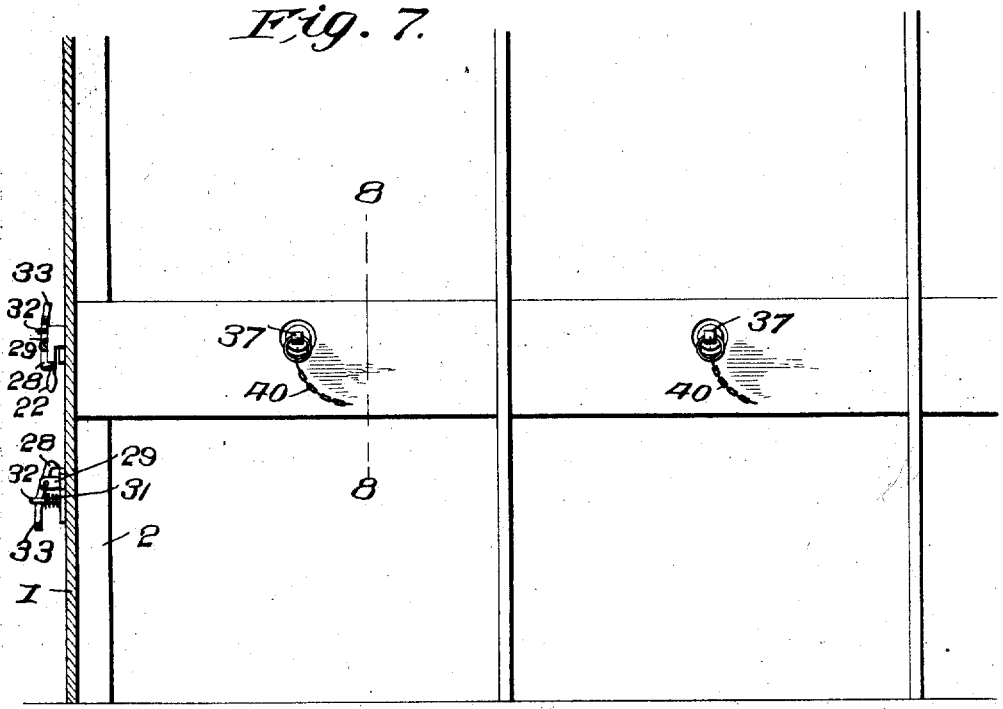
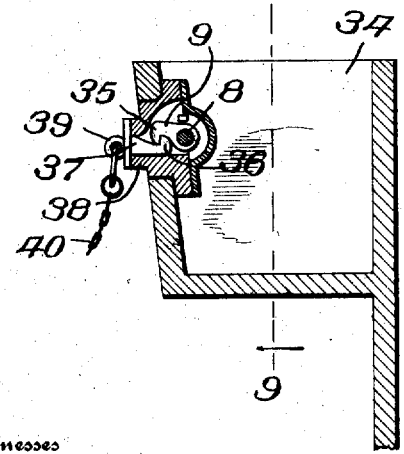
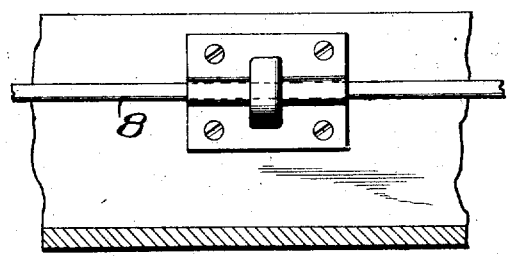
Inventor
H. J. Hanson No. 889,878. PATENTED JUNE 2, 1908.
H. J. HANSON.
ANIMAL RELEASING DEVICE.
APPLICATION FILED NOV. 6, 1906.
4 SHEETS—SHEET 4.

UNITED STATES PATENT OFFICE.

HANS J. HANSON, OF RACINE, WISCONSIN.

ANIMAL-RELEASING DEVICE.

No. 889,878.

Specification of Letters Patent.

Patented June 2, 1908.

Application filed November 6, 1906. Serial No. 342,213.

*To all whom it may concern:*

Be it known that I, HANS J. HANSON, a citizen of the United States, residing at Racine, in the county of Racine and State of Wisconsin, have invented certain new and useful Improvements in Animal-Releasing Devices; and I do hereby declare the following to be a full, clear, and exact description of the invention, such as will enable others skilled in the art to which it appertains to make and use the same.

My invention relates to releasing devices and more particularly to that class of device employed in releasing horses and cattle from their stalls or stanchions and my object is to provide means whereby the stanchions or securing devices may be released instantly and simultaneously from a point without the building.

A further object is to provide means for releasing a door simultaneously with the releasing of the stanchions or the like.

A still further object is to provide means for locking the releasing device in its opened or closed position.

Other objects and advantages will be hereinafter referred to and more particularly pointed out in the claims.

Figure 10:
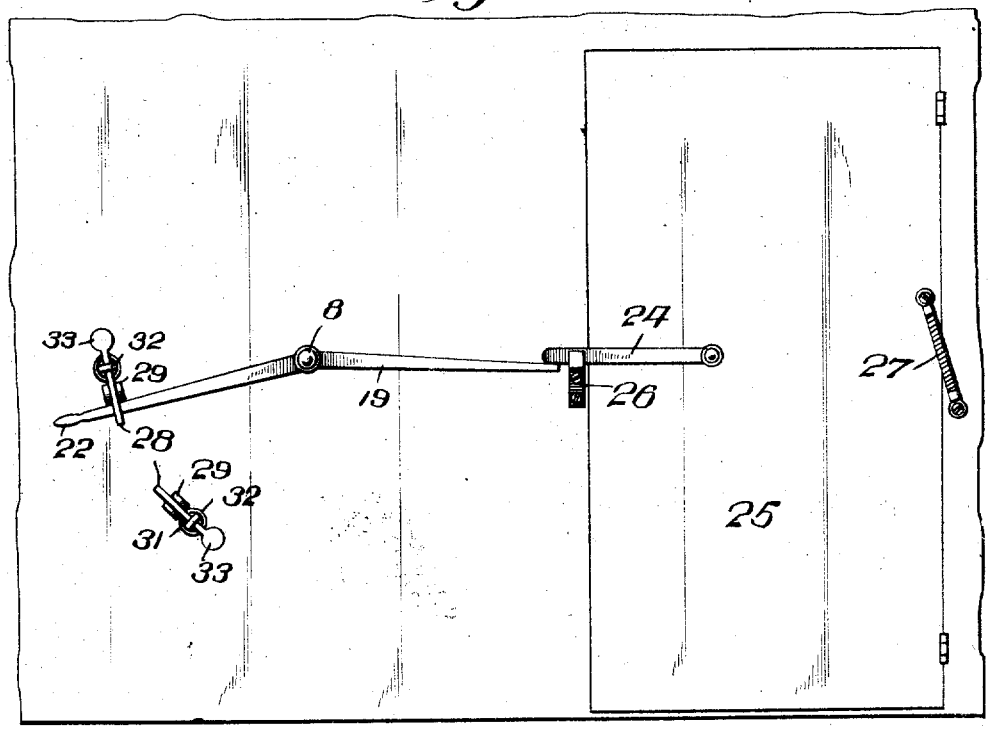
Figure 11:
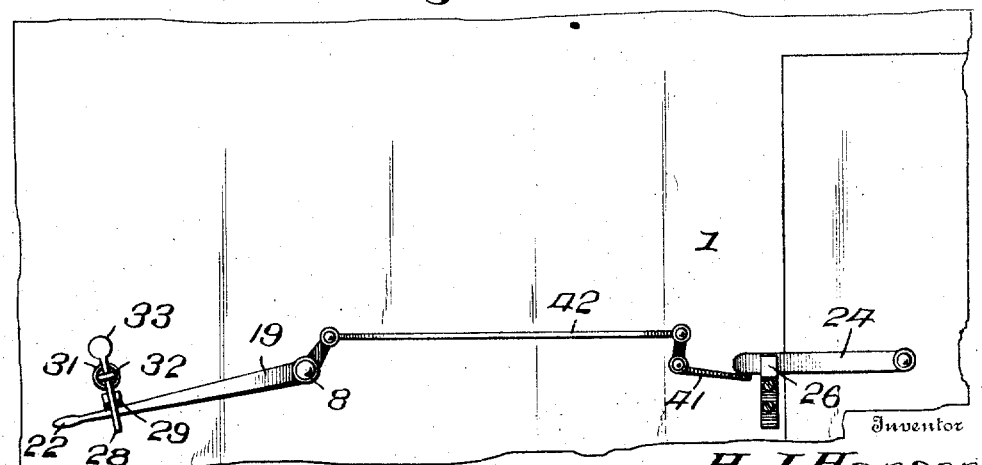

In the accompanying drawings which are made a part of this application, Figure 1 is a front elevation of a plurality of cattle securing stanchions with my improved releasing device secured thereto, the stanchions being shown as closed. Fig. 2 is a detail view, partly in section, showing the stanchions open. Fig. 3 is a sectional view as seen from line 3—3 Fig. 2. Fig. 4 is an elevation of the outside of a building showing the operating lever for my improved releasing device. Fig. 5 is an elevation of a device for locking the releasing lever in its several positions. Fig. 6 is a sectional view as seen from line 6—6 Fig. 5. Fig. 7 is a plan view, partly in section, of a plurality of stalls such as used in stabling horses with my improved releasing mechanism secured thereto. Fig. 8 is a sectional view through one of the stalls as seen from line 8—8 Fig. 7. Fig. 9 is a sectional view as seen from the dotted line 9—9 Fig. 8. Fig. 10 is a plan view of the outside of a building showing the operating mechanism for my improved releasing device, and, Fig. 11 is a similar view of a slightly modified form of operating device.

Referring to the drawings in which similar reference numerals designate corresponding parts throughout the several views, 1 indicates the walls of a building within which is located at any convenient point a plurality of uprights 2, said uprights being so disposed as to form feeding spaces for cattle.

Disposed between the uprights 2 are stanchion bars 3 and 4, the lower ends of said stanchion bars being secured to a plate 5 while the upper ends thereof are disposed between parallel beams 6 and 7, the bar 3 being rigidly secured to the plate and beams while the lower end of the bar 4 is pivotally secured to the plate 5 and the upper end thereof movably disposed between the beams 6 and 7.

Horizontally disposed through the uprights 2 and over the plurality of stanchions is a shaft 8 to which is secured a plurality of arms 9, one of which is disposed between each set of uprights and has secured to the outer end thereof a chain 10, the lower end of which is disposed into connection with a locking bar 11 pivotally secured between the beams 6 and 7, said locking bar having a projection 12 at its free end which is adapted to engage a shoulder 13 upon the stanchion bar 4 when the stanchion is in its closed position, the object of the locking bar being to hold the stanchion 4 in a vertical position and prevent the same from being opened by the animal.

The upper end of the stanchion bar 4 is provided with an ear 14, to which is secured one end of a chain 15, the opposite end of the chain being secured at a predetermined point to the chain 10 so that when the shaft 8 is rotated the locking bar 11 will be elevated out of engagement with the stanchion bar 4 through the medium of the arm 9 and chain 10 and after the locking bar 11 has been elevated sufficiently to clear the end of the stanchion bar 4, the chain 15 will have been drawn taut and the stanchion moved laterally upon its pivot point 16, which operation will release the animal from the stanchion.

The shaft 8 is extended through the wall 1 and is provided on its outer end with an arm 17 to the free end of which is pivotally secured a connecting rod 18. The lower end of the rod 18 is pivotally secured to a lever 19, said lever being pivotally secured to a base member 20 which is in turn secured to the wall 1, one end of the lever adjacent the connection between the lever and the rod 18 being provided with a curved extension 21 while the opposite end thereof is formed into a handle 22 by which means the lever 19 is rocked upon its pivot point 23.

It will now be seen that by this construction all of the animals which are secured between the stanchion bars 3 and 4 may be simultaneously released without the operator entering the building as by grasping the handle 22 and moving that end of the lever 19 downwardly, the shaft 8 will be rocked through the medium of the arm 17 and rod 18 thereby causing the arms 9 and chain secured thereto to release the upper end of the movable stanchion and swing the same to one side. At the same time that the handle end of the lever is disposed to release the stanchions the curved extension 21 will engage a latch 24 pivotally secured at a convenient point upon a door 25 thereby releasing the latch 24 from the keeper 26 whereupon the spring 27 will swing the door upon its hinges and open the same thereby permitting the cattle to leave the building at will.

To prevent the accidental operation of the releasing mechanism I dispose in the path of the lever 19 a pair of spring operated engaging dogs 28 which are pivotally secured between ears 29 on the base member 30 so that when the handle end of the lever 19 is raised or lowered it will be engaged by one of the locking dogs and held in its adjusted position the dogs being held in engagement with the lever by means of a spring 31 disposed around a bifurcated guide 32 and between the base member 30 and the handle portion 33 of the locking dogs. The handle as shown is disposed between the bifurcated portion of the guide 32 as best shown in Fig. 4 of the drawing. The handle end of the lever 19 is elevated and secured into engagement with the upper securing dog; but should it be desired to release the stanchion, pressure is brought to bear upon the handle 33 which action depresses the spring 31 and elevates the hooked end of the locking dog out of engagement with the lever 19 whereupon this end of the lever may be lowered into engagement with the opposite locking dog which will likewise hold the lever in its adjusted position until such time as the handle thereof is depressed.

That form of releasing mechanism shown in Figs. 7, 8 and 9 is adapted more particularly for use in connection with releasing horses and in this instance the shaft 8 is disposed preferably through the manger or feed trough 34 and in this instance the chains are dispensed with and the arms 9 provided at their free ends with depending engaging members 35 which are adapted to coöperate with upwardly extending engaging members 36 upon a securing bolt 37. The bolt 37 is preferably square in cross section and is adapted to enter a square opening in the housing 38 disposed around the arms 9 and a portion thereof extended through the walls of the manger. The outer end of the bolt 37 is provided with an eye 39 to which is secured one end of a halter strap or chain 40. By this construction it will be seen that when the bolt 37 is disposed into engagement with the arms 9 that the horses will be securely held within the stalls and as soon as the shaft 8 is rotated and the engaging member on the arms disengaged from the engaging members upon the bolts that said bolts will be released and can be readily removed from their sockets thereby releasing the horses from the manger.

The lever for operating that form of releasing mechanism shown in Figs. 7, 8 and 9 is also slightly different from that form of lever shown in Fig. 4 in that the lever is secured directly to the end of the shaft 8 and the latch engaging portion of the lever is not curved, this form of lever being shown in Fig. 10 of the drawing.

In Fig. 11 I have shown a slightly modified form of lever from that shown in Fig. 10 in that the latch engaging end of the lever is shortened and a bell crank lever 41 is pivotally secured to the wall 1 adjacent the end of the door latch 24 so that one arm of the bell crank lever will engage the end of the latch 24 and release the same from the keeper 26 while the opposite arm of the lever 41 is pivotally connected to the short end of the lever 19 by means of a pitman 42.

The main object in this device is to provide means for quickly releasing the animals from their stalls in case of fire and it will be readily seen that all of the animals can be simultaneously released and the door opened without having to enter the building.

What I claim is:

1. The combination with an animal securing and holding device; of a shaft, arms on the shaft adapted to engage the securing and holding device, a lever adapted to rotate said shaft, spring actuated dogs in the path of said lever adapted to alternately engage the lever and hold it in its adjusted position.

2. The combination with a releasing device having a lever to operate the same; of locking dogs in the path of said lever whereby when the lever is moved in either direction it will be engaged by one of said dogs and held in its adjusted position, and additional means to move said dog into engagement with the lever.

3. The combination with an inclosure; of an animal securing and holding device, a shaft extending through one wall of said inclosure, arms on said shaft and rigid therewith, means to connect said arms with the animal securing device, means on the outer surface of said wall to rotate said shaft and spring actuated means whereby said securing device may be retained in its operative position.

4. The combination with an inclosure; of an animal securing and holding device, a shaft extending through one wall of said inclosure, arms on said shaft, means to connect said arms with the animal securing device, a door for said inclosure, a latch on said door and means on the outer surface of said wall to simultaneously rotate said shaft and release said latch.

5. The combination with an inclosure; of an animal securing and holding device, a shaft extending through one wall of said inclosure, arms on said shaft and rigid therewith, means to connect said arms with the animal securing device, a spring opened door for said inclosure, a latch on said door, a keeper for said latch, means on the outer surface of said wall to simultaneously rotate said shaft and release said latch from its keeper and additional means whereby said securing device may be retained in its operative position.

6. The combination with a releasing device having a lever to operate the same; of spring actuated locking dogs in the path of said lever whereby when the lever is moved in either direction it will be engaged by one of said dogs and held in its adjusted position.

In testimony whereof I have signed my name to this specification in the presence of two subscribing witnesses.

HANS J. HANSON.

Witnesses:
GEORGE ELHOLM,
JAMES JOHNSON.